United States Patent
Risher et al.

(10) Patent No.: US 8,949,174 B2
(45) Date of Patent: Feb. 3, 2015

(54) DETECTION AND PREVENTION OF UNWANTED CONTENT ON CLOUD-HOSTED SERVICES

(71) Applicant: Google Inc., Mountain View, CA (US)

(72) Inventors: Mark Risher, San Francisco, CA (US); Vishwanath Ramarao, Sunnyvale, CA (US); Naveen Jamal, San Jose, CA (US); Youngnam Maeng, Marina, CA (US); Cory O'Connor, Redwood City, CA (US); Tejaswi Nadahalli, Bangalore (IN); Sonal Rajan, San Jose, CA (US); Parag Namjoshi, Redwood City, CA (US)

(73) Assignee: Google Inc., Mountain View, CA (US)

( * ) Notice: Subject to any disclaimer, the term of this patent is extended or adjusted under 35 U.S.C. 154(b) by 154 days.

(21) Appl. No.: 13/774,485

(22) Filed: Feb. 22, 2013

(65) Prior Publication Data

US 2013/0226938 A1    Aug. 29, 2013

Related U.S. Application Data

(60) Provisional application No. 61/602,946, filed on Feb. 24, 2012, provisional application No. 61/602,958, filed on Feb. 24, 2012, provisional application No. 61/602,960, filed on Feb. 24, 2012.

(51) Int. Cl.
| | | |
|---|---|---|
| *G06F 17/00* | (2006.01) | |
| *G06F 17/30* | (2006.01) | |
| *G06F 21/55* | (2013.01) | |
| *H04L 12/24* | (2006.01) | |
| *G06Q 10/10* | (2012.01) | |
| *G06F 21/31* | (2013.01) | |
| *G06F 21/62* | (2013.01) | |
| *H04L 29/06* | (2006.01) | |
| *H04L 12/58* | (2006.01) | |
| *G06Q 50/00* | (2012.01) | |

(52) U.S. Cl.
CPC ........ *G06F 17/30554* (2013.01); *G06F 21/554* (2013.01); *H04L 41/00* (2013.01); *G06Q 10/107* (2013.01); *G06Q 10/10* (2013.01); *G06F 21/31* (2013.01); *G06F 21/6236* (2013.01); *H04L 63/00* (2013.01); *H04L 51/12* (2013.01); *G06Q 50/01* (2013.01); *H04L 63/1408* (2013.01)
USPC .......... 707/600; 707/607; 707/608; 707/609; 707/791; 707/821

(58) Field of Classification Search
CPC ...................................................... G06F 17/30
USPC .................................................. 707/600–899
See application file for complete search history.

(56) References Cited

U.S. PATENT DOCUMENTS

2012/0066670 A1 *    3/2012    McCarthy et al. ............ 717/169

* cited by examiner

*Primary Examiner* — Isaac M Woo
(74) *Attorney, Agent, or Firm* — Patent Law Works LLP

(57) ABSTRACT

The problem of abuse of privileges at cloud-hosted service sites is addressed by associating each user, preferably across multiple cloud-hosted service sites, with an individual "suspiciousness" score that may vary over time as additional user actions are detected and evaluated. Knowledge of the user is employed to better analyze the appropriateness or acceptability of user actions on the site.

20 Claims, 4 Drawing Sheets

DETECTION AND PREVENTION OF UNWANTED CONTENT ON CLOUD-HOSTED SERVICES

CROSS-REFERENCE TO RELATED APPLICATIONS

This application claims priority to and the benefits of U.S. Provisional Patent Application Nos. 61/602,946 (entitled "ANOMALY-BASED CLASSIFICATION OF SOCIAL MEDIA USER PROFILES"), 61/602,958 (entitled "IMPROVED SOCIAL CONTENT MODERATION USING CLUSTER-BASED SCORING") and 61/602,960 (entitled "CONSOLIDATION OF SOCIAL MEDIA USER PROFILES"), all filed on Feb. 24, 2012. The foregoing applications are incorporated herein by reference in their entireties.

FIELD OF THE INVENTION

The present invention relates, in general, to suppression, moderation, and mitigation of malicious and unwanted transactions on Internet websites.

BACKGROUND

While "spam" is commonly thought of as bulk delivery of unwanted e-mail messages, the emergence of "social media" websites has provided spammers with new opportunities to identify potential recipients for their messages as well as new channels of delivery. The term "social media" refers to technology tools that allow member users to disseminate, discuss, share, or acquire information with or from other members. Social media websites may appeal to a group of individuals with common interests or, more commonly, maintain a broad membership base that allows users to express interests and exchange content generally or with like-minded members. Such content may include links to external websites. Social media is one specialized form of a "cloud-hosted service," i.e., a consumer or business service offered to a diverse group of users who primarily access it through the public Internet. A sales contact database, a webmail program, and a document collaboration tool are each examples of "cloud-hosted services."

The ease of identifying individuals and their interests, and the readily available website-provided channels for communicating with them, strongly attract spammers to social media. Utilizing a social media website's search tools, the spammer can target particular demographic segments or members with common interests, directing links or advertising to such users. While typically forbidden by the social media site's terms of use, this practice is nonetheless widespread and growing due to the mismatch between the spammer's economic incentives—spammers have no operating costs beyond the time involved in identifying users and posting messages, and much spam is automatically generated by so-called spambots—and the ability of a social media site's proprietors to effectively police the site. With the large (and growing) volume of messages posted and exchanged even on small social media websites, human oversight of message content is cost-prohibitive, and indeed, it may be difficult and/or time-consuming even for a trained professional to distinguish between legitimate and spam messages. Virtually every consumer-facing site that permits message posting is now vulnerable to spamming campaigns.

Current approaches to combating "social spam" tend to involve conventional filter analysis of comments, postings, messages, trackbacks and pingbacks as these are posted or delivered. Message-focused blocking techniques are coarse by nature, and may be indifferent to context: low-grade profanity in a sports-related discussion forum is obviously different from an advertisement for a pornographic web site, though the words may be similar. Monolithic rules can sometimes defeat rather than support the policy objectives of a social media site.

It is also possible to base filtering purely on the username rather than on the content of a message. This approach, too, has limitations. Spammers rarely maintain the same exact user information for long, so the "shelf life" of a user-based spam rule (i.e., a user blacklist) may be quite short. While it is possible to extend the rule beyond a specific user—for example, an email-spam filter may build a reputation around an IP address—the result is filter coarseness and the ensuing prospect of false negatives (so too much spam gets through) and/or false positives (which can alienate or even terminate legitimate users). Moreover, these filters tend to lack the ability to retroactively adjust the reputation assigned to a user based upon subsequent signals or behavior. An individual initially identified as a spammer, for example, may demonstrate himself, through later actions, to be a legitimate user, or vice versa.

These approaches operate, by definition, after a new user has signed up with a site. Operators of social media sites would also benefit from preventing suspicious or abusive users from signing up in the first place, and/or by storing the "suspiciousness" of the circumstances at the time the user signed up. While successful blocking of a single abusive user at sign-up may prevent the introduction of significant amounts of spam, the targeting must be precise (i.e., with minimal false positives) or the social media site will not only shun legitimate users but may damage its reputation in the wider community. Unfortunately, it is difficult to profile abusive users based on stable, identifiable characteristics, in part because of the "Darwinian evolution" of spamming activity: abusers closely monitor and reverse engineer filtering methodologies, and survive by adopting strategies to avoid these filters. Moreover, attempts to generate valid, statistically based classifier models of "good" and "bad" social media users typically require human review of significant sample sets—e.g., 10,000 representative examples of "bad" and 10,000 representative examples of "good." Collecting such large sample sets in a scalable fashion and in a timely, economical manner represents a substantial challenge; indeed, by the time the sample is collected, it may be obsolete as the spammers change their patterns to avoid detection.

SUMMARY

As companies offer more cloud-hosted services, the prevalence of abuse continues to rise, and the abuse patterns on these cloud-hosted services mirror those of social media sites. Therefore, the spam problems experienced by social media sites also arise in connection with many other cloud-hosted services. The present invention provides multiple approaches to combating entry of unwanted content on cloud-hosted services, e.g., social spam on social media sites; these may be utilized individually or combined into an integrated system or method.

One approach addresses the problem at the sign-up stage, identifying suspicious or abusive users and preventing them from signing up in the first place. This approach utilizes a relatively small initial data set based on the recognition that while abusers' profiles are mutable and difficult to characterize stably—abusers will deliberately shift their usage patterns to evade detection—a site's legitimate users tend to have similar and stable characteristics; that is, such characteristics are "cohesive" across cloud-hosted service (e.g., social media) sites and their users. The information gleaned from analysis of this small data set can be applied to a much larger, unsorted data set to obtain profiling criteria based on a large population for statistical reliability.

A second approach improves upon the limitations of purely-content-based and purely-user-based solutions, and enhances message analysis by associating each user (author), preferably across multiple cloud-hosted service sites, with an individual "suspiciousness" score that may vary over time as additional user actions are detected and evaluated. Knowledge of the user is employed to better analyze the appropriateness or acceptability of user actions, such as messages posted.

A third approach improves the performance of user-based filters by connecting a single individual or "actor" with multiple user accounts and/or other online identities, thereby creating a "consolidated profile." In this way a confidence level can be established that a particular user account, IP address or other identifying attribute is associated with a particular actor. Different confidence levels may suffice depending on the remediary action to be taken; for example, holding a message for human review is obviously less draconian than rejecting the actor's registration at sign-up, and would therefore require a lower degree of confidence. Employing data from multiple cloud-hosted service sites not only corroborates data relationships and thereby increases associational confidence levels, but allows all such sites to receive the benefits of the consolidated profile for spam-detection and remediation purposes.

Again, any of these approaches may be combined with one or both of the other approaches; all are complementary, but may also be used singly. They may be implemented as methods or systems, and may be deployed on a single server providing anti-spam services to multiple cloud-hosted service sites or on the cloud-hosted service sites themselves.

Accordingly, in a first aspect, the invention pertains to method of registering new users on cloud-hosted service sites. In various embodiments, the method comprises the steps of creating a database of electronically stored labeled records corresponding to known legitimate users registered on at least one cloud-hosted service site, each labeled record including fields corresponding to attributes associated with a legitimate user and values for at least some of the fields; creating a database of electronically stored records corresponding to individuals whose legitimacy as users of the cloud-hosted service is unknown, each unlabeled record including fields corresponding to attributes in the labeled records and values for at least some of the fields; creating a database of electronically stored records corresponding to individuals known to be malicious or undesirable, each unlabeled record including fields corresponding to attributes in the labeled records and values for at least some of the fields; computationally analyzing the database records to assign probabilities or scores to at least some of the attributes and values, the probabilities correlating with a likelihood that a user matching those attributes is a legitimate user; receiving a candidate's request for registration, the request including values for at least some of the attributes in the databases; assessing the values in the registration request against the probabilities and computing a risk score for the candidate based thereon; and taking an action based on the risk score.

In some embodiments, the method further comprises the step of computationally analyzing the unlabeled records to refine the probabilities in the labeled records, e.g., computationally analyzing the unlabeled records comprises selecting attributes with high probabilities in the labeled sample and identifying records in the unlabeled data set having the high-probability attributes. The method may further include identifying new attributes in the records in the unlabeled data set having the high-probability attributes, the new attributes not being present in the labeled records; and adding the new attributes to the labeled records. Values for at least some of the candidate's attributes may be obtained from the cloud-hosted service site. The cloud-hosted service site may be, for example, a social media site. Values for at least some of the candidate's attributes are obtained directly from the candidate's computer, and/or from one or more publicly available databases. Additional values for attributes not contained in the registration request may be obtained from one or more publicly available databases.

In various embodiments, the method further comprises modifying the probabilities based on subsequent actions by user who have been registered based on the risk score. The action may be, for example, causing registration of the candidate or denying registration of the candidate.

In another aspect, the invention pertains to a server for supporting registration of new users on cloud-hosted service sites. In various embodiments, the server comprises a database of electronically stored labeled records corresponding to known legitimate users registered on at least one cloud-hosted service site, each labeled record including fields corresponding to attributes associated with a legitimate user and values for at least some of the fields; a database of electronically stored unlabeled records corresponding to individuals whose legitimacy as cloud-hosted service users is unknown, each unlabeled record including fields corresponding to attributes in the labeled records and values for at least some of the fields; a communications module for receiving, from a querying cloud-hosted service site, a candidate's request for registration thereon, the request including values for at least some of the attributes in the databases; and an analysis module configured to (i) computationally analyze the labeled records to assign probabilities to at least some of the attributes, the probabilities correlating with a likelihood that a user is a legitimate user; (ii) assess the values in the registration request against the probabilities; (iii) compute a risk score for the candidate based thereon; and (iv) communicate the risk score to the querying cloud-hosted service site or cause registration or denial of the candidate based on the risk score.

In various embodiments, the analysis module is further configured to computationally analyze the unlabeled records to refine the probabilities in the labeled records. The analysis module may, alternatively or in addition, be configured to computationally analyze the unlabeled records by selecting attributes with high probabilities in the labeled sample and identifying records in the unlabeled data set having the high-probability attributes. The analysis module may be configured to identify new attributes in the records in the unlabeled data set having the high-probability attributes, the new attributes not being present in the labeled records; and add the new attributes to the database of electronically stored labeled records. In some embodiments, values for at least some of the candidate's attributes originate with the cloud-hosted service site. The analysis module may be configured to obtain, via the communications module, values for at least some of the candidate's attributes from one or more publicly available databases and/or additional values for attributes not contained in the registration request from one or more publicly available databases. In some embodiments, the analysis module is further configured to modify the probabilities based on subsequent actions by user who have been registered based on the risk score.

In another aspect, the invention relates to a method of moderating activities on cloud-hosted service sites. In various embodiments, the method comprises the steps of creating a database record for a first user when the first user registers at a first cloud-hosted service site, the database record including a plurality of profile fields and data in at least some of the profile fields; based on data in the profile fields of the first user's database record, assigning an initial risk score to the first user; identifying a cluster of database records associated with other users based on similarities in the profile fields thereof with respect to the profile fields of the first user, the record cluster having an associated composite risk score based on risk scores associated with the other users; assigning the composite risk score to the first user; and based on the first user's resultant risk score, taking an action with respect to a transaction conducted by the first user on the first cloud-hosted service site.

In various embodiments, the method further comprises modifying the first user's risk score based on actions taken by the first user over time. The action may be taken also based on a message-level risk score, which may itself be dictated by characteristics of the message and/or proximity in time and IP address to prior actions that have been identified as objectionable. The profile fields on which the initial risk score is assigned may comprise username, geographical location of the first user, and prior actions associated with the first user's computer. The initial risk score may be based at least in part on a probability that the username was computationally generated. The may be alerting the first cloud-hosted service site to prevent the transaction from completing and/or preventing the first cloud-hosted service site (which may, for example, be a social media site) from posting the message. In some embodiments, the action is applied to each of the other users in the identified cluster.

In still another aspect, the invention pertains to a server for moderating activities on cloud-hosted service sites. In various embodiments, the server comprises a master database comprising electronically stored records for users registered at a plurality of cloud-hosted service sites, each database record including a plurality of electronically stored profile fields and data electronically stored in at least some of the profile fields; a communications module for communicating bidirectionally with cloud-hosted service sites, the communications module being configured to receive, from the cloud-hosted service sites, messages posted by users thereon and data associated with newly registering users; and an analysis engine for managing the master database and assessing messages posted by users on cloud-hosted service sites and received via the communications module, the analysis engine being configured to (i) create a database record for a first user when the first user registers at a first cloud-hosted service site, the database record including a plurality of profile fields and data, received via the communications module from the first cloud-hosted service site pursuant to the first user's registration thereon, in at least some of the profile fields; (ii) compute an initial risk score for the first user based on data in the profile fields of the first user's database record and assign the initial risk score to the first user; (iii) identify a cluster of records in the master database associated with other users based on similarities in the profile fields of the corresponding database records, the cluster having an associated composite risk score based on risk scores associated with the other users; (iv) assign the composite risk score to the first user; and based on the first user's composite risk score, take an action with respect to a message posted by the first user on the first cloud-hosted service site.

In some embodiments, the analysis module is further configured to (i) receive data from the first cloud-hosted service site corresponding to actions taken by the first user over time and (ii) modify the first user's risk score based on the received data. The analysis module may be configured to take the action based also on a message-level risk score; the message-level risk score, in turn, may be dictated by characteristics of the message and/or proximity in time and IP address to prior actions that have been identified as objectionable.

The profile fields on which the initial risk score is assigned may comprise username, geographical location of the first user, and prior actions associated with the first user's computer. The initial risk score may be based at least in part on a probability that the username was computationally generated. The action may be sending an alert, via the communications module, to the first cloud-hosted service site to suppress posting of the message, or preventing, via the communications module, the first cloud-hosted service site from posting the message.

Yet another aspect of the invention pertains to a method of associating user records across a plurality of cloud-hosted service websites, wherein (i) each of the user records comprises a plurality of fields relevant to identity and values for at least some of the fields and (ii) at least some of the user records lack sufficient data to identify a unique actor. In various embodiments, the method comprises the steps of identifying a first user record associated with a first cloud-hosted service site; identifying a second user record associated with a second cloud-hosted service site based on similarity between at least one field value in the second user record and a corresponding field value in the first user record; computationally determining a probability that the first and second user records are associated with the same actor based on similarities between additional corresponding field values in the first and second user records; and if the probability exceeds a threshold, taking an action with respect to the first user on the first cloud-hosted service site based on a score associated with the second user record.

The score may correspond to a suspiciousness level, a common interest and/or receptiveness to advertisements. In various embodiments, the method further comprises identifying a third user record associated with a third cloud-hosted service site based on similarity between at least one field value in the third user record with a corresponding field value in at least one of the first user record or the second user record; computationally determining a probability that the first and third user records are associated with the same actor based on similarities between corresponding field values in the first and third user records; and computationally adjusting the determined probability based on similarities between corresponding field values in the second and third user records.

The field values may include at least one of an email address, originating IP address, one or more identifiers associated with an originating computer, one or more identifiers associated with client software, a timestamp, a geographic location, at least one self-reported field, at least one behavioral attribute, or at least one specified interest. The action may be causing the first cloud-hosted service site to hold a message from a user associated with the first user record for human review and/or causing the first cloud-hosted service site to reject registration of a user associated with the first user record.

In still another aspect, the invention relates to a server for associating user records across cloud-hosted service website.

In various embodiments, the server comprises a first memory for storing a first user record associated with a first cloud-hosted service site, the user record comprising a plurality of fields relevant to identity and values for at least some of the fields but lacking sufficient data to identify a unique actor associated with the first user record; a second memory for storing a second user record associated with a second cloud-hosted service site based on similarity between at least one field value in the second user record and a corresponding field value in the first user record; and an analysis module configured to (i) computationally determine a probability that the first and second user records are associated with the same actor based on similarities between additional corresponding field values in the first and second user records; and (ii) if the probability exceeds a threshold, cause an action to be taken with respect to the first user on the first cloud-hosted service site based on a score associated with the second user record.

The score may correspond to a suspiciousness level, a common interest and/or receptiveness to advertisements. The analysis module may be further configured to identify a third user record associated with a third cloud-hosted service site based on similarity between at least one field value in the third user record with a corresponding field value in at least one of the first user record or the second user record; computationally determine a probability that the first and third user records are associated with the same actor based on similarities between corresponding field values in the first and third user records; and computationally adjust the determined probability based on similarities between corresponding field values in the second and third user records. The field values may include at least one of an email address, originating IP address, one or more identifiers associated with an originating computer, one or more identifiers associated with client software, a timestamp, a geographic location, at least one self-reported field, at least one behavioral attribute, or at least one specified interest. The action may be causing the first cloud-hosted service site to hold a message from a user associated with the first user record for human review and/or causing the first cloud-hosted service site to reject registration of a user associated with the first user record.

As used herein, the term "spam" generically refers to unwanted postings, messages, email, etc.—and typically, for purposes hereof, to material posted to cloud-hosted services. The term "transaction" includes a posting or other entry of content onto, or other interaction with, a cloud-hosted service. The term "message" generically refers to a posting, note, comment or other form of communication sent or made available by a user, either generally or to a selected audience, via a cloud-hosted service website; and an "action" generically refers to user execution of a site-supported function or utilization of a site-provided capability, e.g., posting a message, uploading a profile, communicating with another user, etc.

Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

BRIEF DESCRIPTION OF THE DRAWINGS

In the drawings, like reference characters generally refer to the same parts throughout the different views. Also, the drawings are not necessarily to scale, with an emphasis instead generally being placed upon illustrating the principles of the invention. In the following description, various embodiments of the present invention are described with reference to the following drawings, in which.

DETAILED DESCRIPTION

1. Representative Server Implementation

Figure 1:
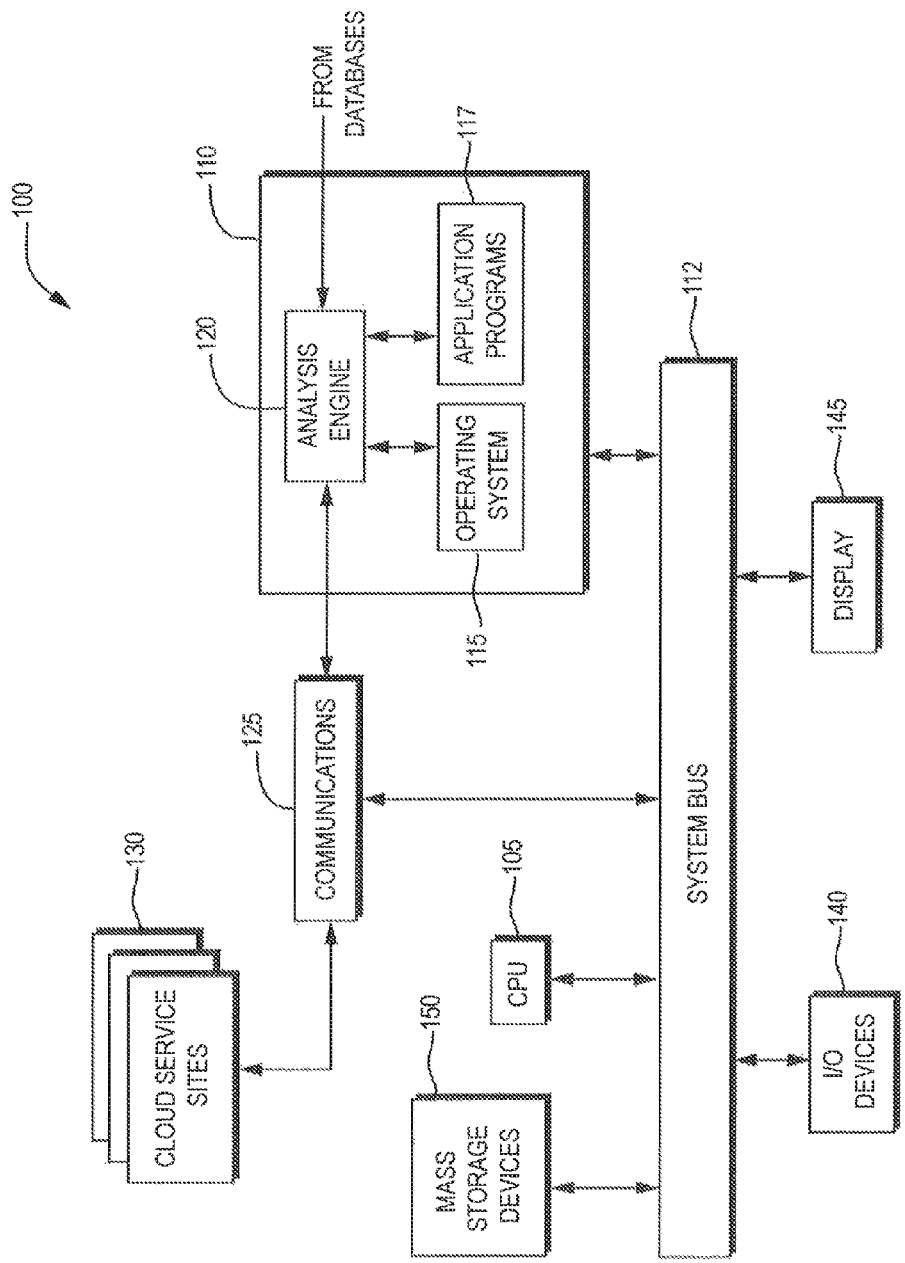
FIG. 1 illustrates a generalized system environment for implementing embodiments of the present invention.

Refer first to FIG. 1, which illustrates, in block-diagram form, a hardware system suitable for implementing the various functions of the present invention and communicating results to servers for cloud-hosted service sites. It should be understood, however, that these components may also be within the cloud server itself, i.e., the cloud server can provide the antispam functionality described herein. The illustrated antispam server 100 may comprise or consist of a general-purpose computing device in the form of a computer including a central processing unit (CPU) 105, a system memory 110, and a bidirectional system bus 112 that couples various system components, including the system memory 110, to the processing unit 105. The system memory 110 may include computer storage media in the form of volatile and/or non-volatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by processing unit. The data or program modules may include an operating system 115, application programs 117, other program modules, and program data. The operating system 115 may be or include a variety of operating systems such as Microsoft WINDOWS operating system, the Unix operating system, the Linux operating system, the Xenix operating system, the IBM AIX operating system, the Hewlett Packard UX operating system, the Novell NETWARE operating system, the Sun Microsystems SOLARIS operating system, the OS/2 operating system, the BeOS operating system, the MACINTOSH operating system, the APACHE operating system, an OPENSTEP operating system or another operating system of platform. The operative functions of the invention are, in general, implemented by an analysis engine 120 whose characteristics are described in greater detail below.

A conventional communication module 125 handles communications between server 100 and outside computational entities such as cloud-hosted service (e.g., social media) sites 130. In this way, the functions of the present invention can be performed on a remote basis as a service. Communication module 125 generally includes a network adapter for wired or wireless interface to a computer network (such as the Internet) and/or a transceiver for data transfer over a telecommunications facility operated by a carrier. For simplicity, the discussion below treats communications between analysis engine 120 and cloud-hosted service sites 130 as occurring directly, but this is to provide a conceptual framework for understanding the operation of the invention; in fact, communications typically occur on a server-to-server basis via conventional network protocols over wired or wireless connections organized as a wide-area network, a local-area network, or the carrier-operated telecommunications infrastructure.

The server's operator may interact with the system 100 using an input-output device 140 such as a keyboard, a position-sensing device (e.g., a mouse), etc. The output of either device can be used to designate information or select particular areas of a screen display 145 to direct functions to be performed by the system. The computing environment may also include other mass storage devices 150, directly connected to system bus 112 (as indicated) or accessible externally via communications module 125. For example, a hard disk drive may read or write to nonremovable, nonvolatile magnetic media. A magnetic disk drive may read from or writes to a removable, nonvolatile magnetic disk, and an optical disk drive may read from or write to a removable, nonvolatile optical disk such as a CD-ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media are typically connected to the system bus through a removable or non-removable memory interface. The databases discussed below may reside on one or more of these mass storage devices, and the term "memory" may connote RAM, ROM, or mass-storage media.

Analysis engine 120 may be implemented by computer-executable instructions, such as program modules, that are executed by a conventional computer. Moreover, the same analysis engine may be used to implement the various functions described below in connection with different facilities of the invention, or, depending on design preferences, each facility may be implemented as a separate computational entity. Generally, program modules include routines, programs, objects, components, data structures, etc. that perform particular tasks or implement particular abstract data types. Those skilled in the art will appreciate that the invention may be practiced with various computer system configurations, including multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer-storage media including memory storage devices. Any suitable programming language may be used to implement without undue experimentation the analytical functions performed by analysis engine 120. Illustratively, the programming language used may include assembly language, Ada, APL, Basic, C, C++, C*, COBOL, dBase, Forth, FORTRAN, Java, Modula-2, Pascal, Prolog, Python, REXX, and/or JavaScript for example. Further, it is not necessary that a single type of instruction or programming language be utilized in conjunction with the operation of the system and method of the invention. Rather, any number of different programming languages may be utilized as is necessary or desirable. Moreover, attribute correlations and probabilities may be built using a grid computing (map:reduce) framework.

CPU 105 may be a conventional processing unit that executes commands and instructions and/or may be or utilize any of a wide variety of other technologies including special-purpose hardware, a microcomputer, mini-computer, mainframe computer, programmed micro-processor, micro-controller, peripheral integrated circuit element, a CSIC (customer-specific integrated circuit), ASIC (application-specific integrated circuit), a logic circuit, a digital signal processor, a programmable logic device such as an FPGA (field-programmable gate array), PLD (programmable logic device), PLA (programmable logic array), RFID processor, smart chip, or any other device or arrangement of devices capable of implementing the steps of the processes of the invention.

Described below are three separate facilities that address the problem of social spam in different ways. These facilities may be utilized separately or in any combination, depending on design choice. Implementing them together, on the same server, provides a comprehensive, multi-faceted defense system for combating social spam that may serve the needs of many cloud-hosted service sites on a service basis. Alternative implementations are possible, of course; the various facilities may be implemented individually, i.e., as logically or physically distinct entities, and need not reside on a computer distinct from the cloud-hosted service website server that benefits from its functionality. Instead, elements of the present invention may be implemented directly on cloud servers, either as self-standing computational facilities or as "agents" that provide some functions locally but also communicate as background processes with a central server 100.

2. Anomaly-Based Classification of User Profiles

A first facility provided by some embodiments of the invention addresses the problem of social spam at the sign-up stage—that is, possible abusers are identified before they are allowed into the community. Embodiments of this facility utilize a relatively small initial data set based on the recognition that while abusers' profiles are mutable and difficult to characterize stably—abusers will deliberately shift their usage patterns to evade detection—a site's legitimate users tend to have similar and stable characteristics; that is, such characteristics are "cohesive" across cloud-hosted service sites and their users. The information gleaned from analysis of this small data set can be applied to a much larger, unsorted data set to obtain profiling criteria based on a large population for statistical reliability.

In accordance with embodiments of the invention, a relatively small data set of known legitimate users is employed to identify attributes highly correlated with these users in an automated, computationally tractable fashion. This data set may be small in size but reflect data from multiple cloud-hosted service sites to avoid spurious correlations specific to a particular site (due to a narrow, self-selected population, for example). Whether or not each such attribute is also correlated with spammers is not terribly important so long as the overall set of identified attributes is more strongly correlated with legitimate users than with spammers. These attributes are preferably based on data gathered in the normal course of registering a new user, and may extend to derivative attributes—i.e., data computationally derivable from the base set of attributes.

In some embodiments, the invention utilizes Bayesian statistical techniques to evaluate a new user. The prior Bayesian probability is the likelihood that any new user is legitimate, and the conditional probabilities are those associated with attributes correlated with legitimate users—i.e., the probability that a user with a particular attribute is a legitimate user.

In a representative approach, a set of legitimate users is obtained within a defined historical period (e.g., the previous month) across one or more cloud-hosted service sites. While each cloud-hosted service site will obtain many of the same attributes from new users, the attribute sets obtained by different sites may vary in statistically useful ways. When a new user signs up with a cloud-hosted service site, the user may enter an email address and a username, and the site may detect the user's IP address and an identifier (e.g., web browser version) associated with the computer. The site server will also record the time of day, and the user may also enter various interests. Different sites may obtain further information directly from the user, e.g., name, address, and/or geographical location, and may obtain further information from the user's computer, e.g. web browser attributes, system timezone, and rich media capabilities. Some cloud-hosted service sites may include JavaScript or other programming that elicits information from a user's browser or allows the browser to send information directly to the site.

Each of these attributes may be a field in a database record assigned to the user. This "labeled" sample set—labeled in the sense that the set has been screened to contain only legitimate users—is then stored as a series of such database records and analyzed. Each record may collectively reflect attributes obtained from all cloud-hosted service sites, even if not all sites collect every attribute from new users; in other words, the record for each user in the sample set reflects the union of all attributes considered in the analysis.

Values for each attribute across the labeled sample set are analyzed to determine each value's prevalence thereacross. For example, some IP addresses may recur with greater frequency than other addresses, so the recurring addresses have a higher correlation or probability (or conditional probability level) with user legitimacy. A "legitimate" user, as this term is used throughout the present specification, is one whose online conduct when using the resources of a cloud-hosted service site conforms to the policies of that site. Although a single criterion of legitimacy across cloud-hosted service sites is ideal, it is not necessary to proper operation of the invention, since user policies across cloud-hosted service sites do not vary significantly; accordingly, in a typical implementation, each cloud-hosted service site is free to distinguish between legitimate and abusive users according to its own criteria. Accordingly, the database records in the labeled sample set may have the following form:

TABLE 1

Labeled Sample Set

| User | Attribute 1: IP Address | Attribute 2: User name | Attribute 3: User address |
|---|---|---|---|
| User 1 | Value: <IP Address 1> <Probability for IP Address 1> | Value: <User name 1> <Probability for User name 1> | Value: <User Address 1> <Probability for User Address 1> |
| User 2 | Value: <IP Address 2> <Probability for IP Address 2> | Value: <User name 2> <Probability for User name 2> | Value: <User Address 2> <Probability for User Address 2> | where only three representative attributes are illustrated; typical records would have more. Angle brackets denote data (such as strings or numerical values).

Once established, these probabilities may be computed across a much larger unlabeled sample set—i.e., a larger but unfiltered historical set of cloud-hosted service users, as opposed to one that has been restricted to only legitimate cloud-hosted service users—in order to refine the probabilities with greater statistical certainty. This may be accomplished, for example, by selecting attributes with high probabilities in the labeled sample and identifying users in the unlabeled data set with those high-probability attributes. For unlabeled users so identified, the existence in their database records of other attributes—i.e., "connected components"—identified during analysis of the labeled sample set is assessed. Accordingly, the number of attributes initially developed during analysis of the labeled data set may be expanded based on correlation over a broader unfiltered population.

Indeed, the unlabeled data set to which the initially identified attribute probabilities are applied may be broader than site users. Commercial or public databases may include not only the attributes identified by analysis of the labeled data set but many others, and these can be analyzed to identify additional correlated attributes. For example, a public database of common French surnames may be used to determine the probability of a particular character sequence being supplied by a French user.

Analysis of the labeled and unlabeled data sets results in a set of probabilistically correlated attributes expected, to different degrees according to their probabilities, to be present for a legitimate user. To the extent that a new candidate user's attributes differ from the normative values found in the legitimate user data set, the probability that he is a legitimate user decreases. Importantly, because of the probabilities assigned to different attributes, some deviations are more important than others in the probability computation; and because these probabilities have been established over a broad population, they are statistically meaningful. In Bayesian terms, the analysis across labeled and unlabeled sample sets associates conditional probabilities with the various attributes, and these are applied using Bayes' rule to attributes associated with a candidate user to determine a probability that the candidate is a legitimate user. If the probability is insufficiently high according to a cloud-hosted service site's policies (which balance the need to avoid spam with the desire to avoid erroneous user rejections), the user may be denied registration. The analysis may be carried out by each site or, more typically, by a central service to which multiple cloud-hosted service sites subscribe as customers—e.g., the server 100 shown in FIG. 1, as detailed below.

As noted earlier, analysis across the unlabeled data set may identify new attributes not in the labeled sample, i.e., not tracked or obtained by cloud-hosted service sites. These may nonetheless be used during registration analysis by, for example, obtaining enough identifying information from a candidate user to consult a public or private database in which the additional information may be found, or by modifying site policies to require provision of data for these attributes as a condition of registration.

Figure 2:
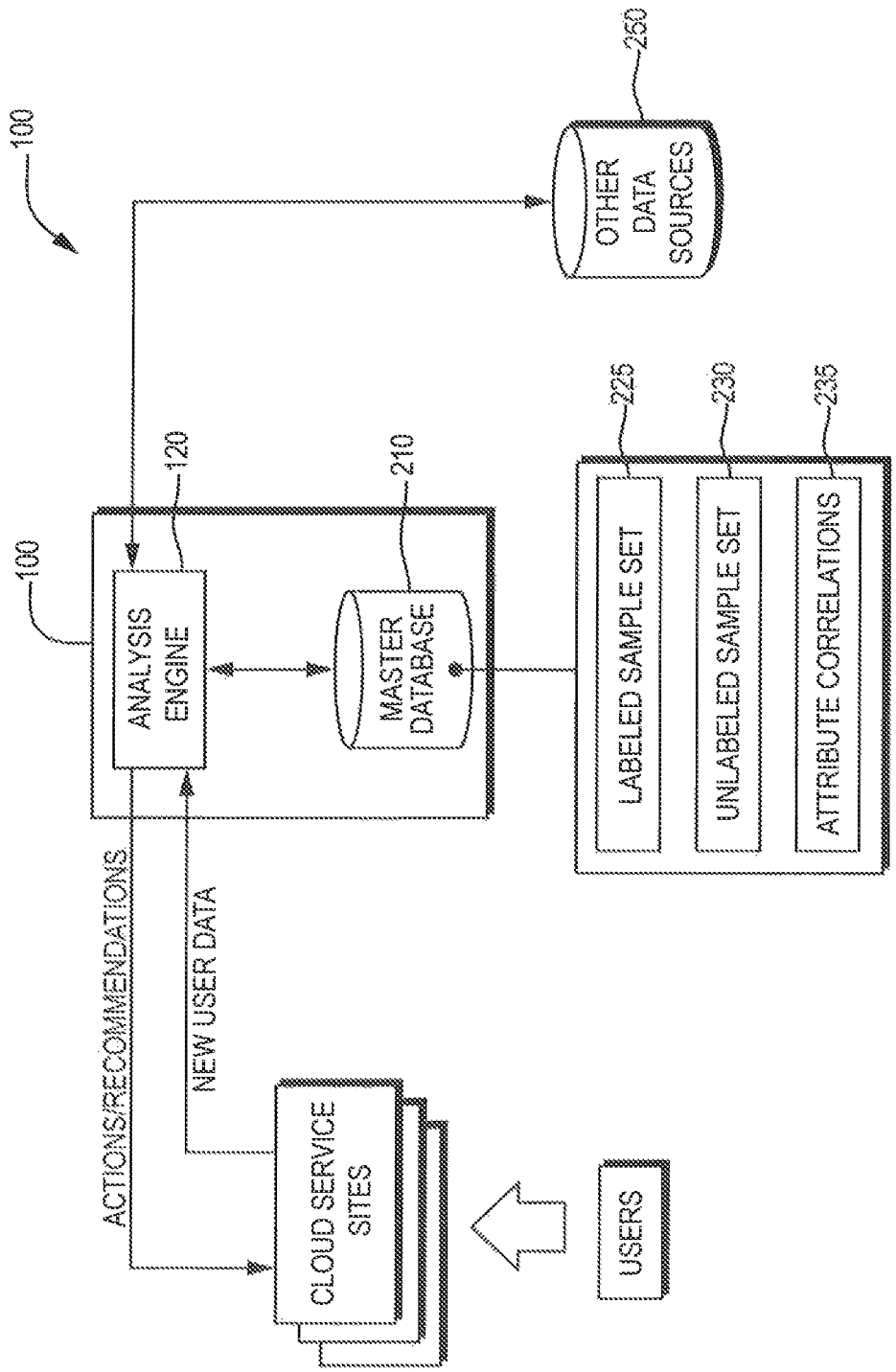
FIGS. 2 and 3 are a simplified block diagrams of computer systems for implementing various embodiments of the present invention.

A representative system implementation is shown in FIG. 2; for simplicity, the server 100, illustrated in detail in FIG. 1, is abbreviated for ease of illustration. The illustrated antispam server 200 includes analysis engine 120 and a master database 210. Master database 210 includes a series of partitions 225, 230, 235 for, respectively, the labeled sample set, the unlabeled sample set, and the attribute correlations identified by analysis engine 120 in the manner described above. As used herein, the term "partition" can mean logically or physically separate memory regions, but can also connote separate databases that may or may not be stored in server 100; instead, one or more of the databases or database partitions may be stored, for example, on network storage devices.

User characteristics relevant to labeled sample set 225 are obtained from one or more cloud-hosted service sites 240 and analyzed manually or computationally, or some combination, and are electronically stored in database partition 225 in the manner described above. Analysis engine 120 produces attribute correlations and probabilities 235 based on analysis of the labeled sample set 225, and further refines these based on analysis of the larger unlabeled sample set 230, which is also drawn from cloud-hosted service sites 240 but, in addition, may have data obtained from other external sources of data representatively indicated at 250. Such sources of data may include lists of IP addresses known to have engaged in malicious activity, or lists of email addresses whose passwords have been reported as stolen. The probabilities may be still further refined by feedback; for example, if a registered user is discovered to have engaged in abusive conduct, it may be assumed that this user "spoofed" the system and, consequently, his attributes upon registration may be retrieved and probabilities assigned to these attributes reduced to reduce the likelihood of future false positives. As used herein, the term "electronically stored" includes storage in volatile or non-volatile storage, the latter including disks, Flash memory, etc., and extends to any computationally addressable storage media (including, for example, optical storage).

Once attribute correlations and probabilities 235 have been established, analysis engine 120 receives new user data from cloud-hosted service sites 240 as visitors to these sites attempt to register. Analysis engine 120 assesses new user data from a registration candidate against attribute correlations and probabilities in database partition 235, and assigns a risk score to the candidate. Depending on the magnitude of the risk score and the policies of the cloud-hosted service site, direct action can be taken by server 100 (denying registration, for example) or server 100 can instead provide a recommendation (e.g., register/do not register) or the raw risk score to the querying cloud-hosted service site 240.

3. Social Content Moderation Using Cluster-Based Scoring

As noted above, risk-related attribute probabilities may be refined based on the subsequent activities of users initially scored as legitimate. A second facility provided by some embodiments of the invention generalizes this approach to improve upon the limitations of purely content-based and purely user-based solutions. These embodiments enhance message analysis by associating each user (author), preferably across multiple cloud-hosted service sites, with an individual "suspiciousness" score that may vary over time as additional user actions are detected and evaluated. Knowledge of the user is employed to better analyze the appropriateness or acceptability of message content.

An initial score may be assigned when the user registers with a site, which may be expressed as a unitary value or in terms of values associated with several spammer-suggestive attributes, and that score is adjusted based upon the classification of subsequent actions performed by that user. In addition, embodiments of the invention cluster users with similar suspiciousness scores or profiles for analysis purposes and to associate a user's reputation with those of his "neighbors" (i.e., members of his cluster). Each cluster is associated with its own score, which, again, may be a unitary overall "spammer likelihood" score or may instead reflect particular categories of risk, e.g., likelihood of posting commercial content, or racist or hate speech, or insulting messages; this allows cloud-hosted service sites to set granular exclusion policies based on site-specific criteria or priorities. The cluster score allows anti-spam actions to be taken based on the cluster-level risk rather than the user-level risk, so that suspiciousness signals present at sign-up time are used to determine whether to block a user's first posting because he belongs to a high-risk cluster—even if the suspiciousness signals at the individual user level and for the individual post are insufficient to make a determination. The decision to block may be based, for example, on the cluster risk and a risk score assigned to the particular user action.

It should be emphasized that the present invention may be used to score user commonalities other than suspiciousness. For example, actions may be taken with respect to a new user based on, for example, a common interest with members of a cluster or a cluster-based score indicating a user's receptiveness to advertisement. In general, the invention is used to group or associate clusters of disparate user identities based upon shared attributes, behaviors, and access patterns among them.

Figure 3:
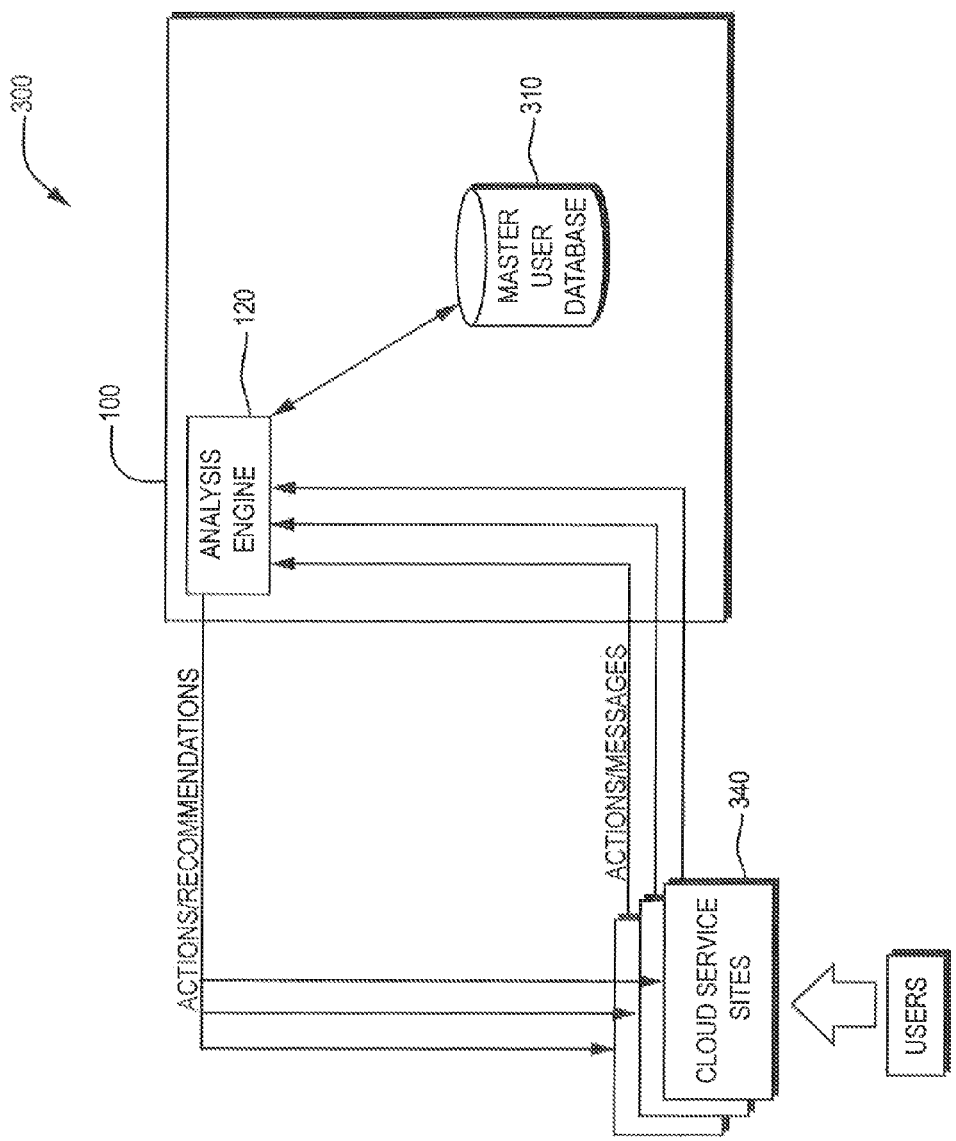

A representative system 300 implementing the invention is illustrated in FIG. 3; for simplicity, the server 100, illustrated in detail in FIG. 1, is abbreviated for ease of illustration. The illustrated antispam server 300 includes analysis engine 120 and a master user database 310. Messages posted to, or user actions taken on, customer cloud-hosted service sites 340 may be sent to antispam server 300 by means of an automated process running on each of the cloud servers 130; for example, this process may access the antispam server 300 via the Internet using an application program interface (API). In other embodiments, the antispam server 300 itself hosts one or more of the cloud-hosted service websites 340, or may employ a "pull" approach that retrieves messages from the websites 340 on a periodic basis.

Analysis engine 120 analyzes messages and actions received from cloud-hosted service sites 340 and populates entries in master database 310. Data records in database 310 may be, for example, organized by user at the record level. In a representative implementation, each user record has a plurality of data fields, some of which correspond to suspiciousness signals. As explained below, a score may be computed and entered in each of the fields for which information is available. Alternatively, many of these factors for which data is available may simply be analyzed together to create an overall suspiciousness score for the individual; it is not necessary, in other words, for data corresponding to each factor to be explicitly stored in a data field. But for purposes of illustration, the ensuing discussion will assume separate scoring of different risk fields associated with each record. These "extrinsic" suspiciousness factors relate to the source of a message or action, and may change over time as new information is developed regarding the particular user. In addition (and optionally), a new action or message itself may have an "intrinsic" suspiciousness value depending on the nature of the action or message itself as described below.

TABLE 2

Labeled Sample Set

| User | Attribute 1: IP Address | Attribute 2: User name | Attribute 3: Browser Type |
|---|---|---|---|
| User 1 | Value: <IP Address 1>* | Value: <User name 1> | Value: <Browser Type 1>* |

TABLE 2-continued

Labeled Sample Set

| User | Attribute 1: IP Address | Attribute 2: User name | Attribute 3: Browser Type |
|---|---|---|---|
| User 2 | Value: <IP Address 2> | Value: <User name 2> | Value: <Browser Type 2> |
| User 3 | Value: <IP Address 1>* | Value: <User name 3> | Value: <Browser Type 1>* |

In the example in Table 2, the records indicating User 1 and User 3 may be clustered together, indicating a particular likelihood of them being controlled by the same person. Even though the User Name is different, because both accounts are accessed from a common IP Address (IP Address 1) and Web Browser Type (Browser Type 1), there exists a higher likelihood that User 1 and User 3 are both controlled by the same person. In contrast, User 2 is unlikely to be controlled by the same person, since it has different values for all three of these attributes.

When a user registers with a cloud-hosted service site, a tentative population of risk scores across data fields for the individual can be developed based on objective factors such as the choice of username, the geographical location of the user (i.e., where she is visiting from), and prior actions of the computer she is using. However, given the sparsity of data (the user has not actually done anything bad yet) and the risks of a mistake (deleting an account at signup can be an unrecoverable insult to an innocent user), taking strong action (e.g. deleting the account) at signup time is not recommended. But the information may be used to assign the new user to a cluster as described below.

The suspiciousness of a username may be assessed computationally based on factors suggesting automated generation. These factors may include the presence of numbers and characters and how they are distributed or clustered, the length of the username, and the frequency of letter trigrams corresponding to English words or word fragments, for example. Based on these factors, an automated process can distinguish between, for example, a likely legitimate "jsmith123@yahoo.com" and a suspicious "dj27shsh37sjs37shsdj@yahoo.com."

While suspiciousness cannot reliably be associated with wide geographic areas, the smaller the region and the greater the level of recently suspicious activity, the greater will be the justified level of suspicion. The user's IP address is often a proxy for geographic location, and similarities between IP addresses—more typically, portions of IP addresses—may have greater relevance if the associated activity is recent. For example, if 17 messages determined to be spam have been sent from the same IP address in the past 30 days, a new account traceable to the same or a closely related IP address will have a high degree of suspiciousness; but the suspiciousness level decays over time, just as it does as the geographical region expands, because the correlation becomes less certain. Accordingly, a suspiciousness value may be assigned to a new action based on proximity in time and IP address to prior actions that have been scored as spam or otherwise objectionable.

If two actions are received from an identical IP address within a short window of time, the likelihood they were performed by the same individual is high, and thus the suspiciousness of the prior action associated with that IP address bears on the suspiciousness of the new action from the same source. Because of the loose association between an IP address and a particular user, however, the degree of confidence that the source is, in fact, the same can be based on a corroborating factor—e.g., temporal proximity. For example, the confidence level associated with a IP-address match might be, e.g., 75% within a single day, 50% if within 3-7 days, etc. By contrast, an e-mail address can usually be assumed to be highly associated with a single individual, and an unambiguously unique identifier may be computed for a given computer to provide maximal confidence that two actions should be associated with regard to suspiciousness; moreover, in some implementations, a device ID or a unique cookie is used to further increase the confidence level. The suspiciousness level assigned to a new action based on prior objectionable actions assumed to emanate from the same source based on IP, e-mail address, or machine identity, therefore, can be weighted (e.g., multiplied) by this confidence level to obtain an adjusted level that accounts for uncertainty.

Prior suspicious actions associated with an IP address include registration of a user that has posted messages determined to be objectionable; prior suspicious actions associated with a particular user or computer include prior postings of spam, evidence of malicious activity, or impermissible profanity in a posting or profile upload. Having been deemed objectionable, these activities obviously justify a high suspicion level. Activities that deviate from normal patterns (e.g., deviations from a historical sending or posting rate, or from historical text patterns) can also be suspicious, particularly if such deviations are known to be associated with spam behavior.

Analysis engine 120 computes a risk profile for a new action based on these factors—user name associated with the action, geographic location, prior actions associated with IP address, prior actions associated with computer—which, it should be stressed, are exemplary only. The resulting database record for a new user will have field values corresponding to risk scores for each factor, to the extent information is available to be processed by analysis engine 120.

Analysis engine 120 groups users into clusters based on a criterion of similarity. The objective is to associate users so that risk may be based on the cluster rather than on the individual, for whom information may be incomplete and/or underdeveloped. Cluster-based risk scoring is particularly important for new users who do not have a reputation based on a history of activity. In fact, each user record may have a "reputation" field that reflects the suspiciousness or risk level associated with the individual, and which may change over time depending on the user's behavior. But initially, the user's reputation is set based on the cluster, e.g., as the cluster mean. The cluster analysis may therefore be employed at the sign-up phase as well as subsequently, as the user posts messages and takes actions. Over time, these actions contribute to the user's individual reputation, which may gradually be weighted more heavily than the cluster score as it becomes more reliable (i.e., based on enough time and user actions to be trustworthy).

"Similarity" between users for clustering purposes depends on similar values for the individual risk factors, of course, since the overall objective is to score risk. But since new users will necessarily have incomplete database records, other factors that tend to relate one user to others can be used in the cluster analysis in order to identify a cohort of similar users. These factors may include, for example, personal preference and interest data that the user supplies to the cloud-hosted service site (e.g., favorite movie, homepage URL), detected device signals (computer device ID, operating system version), and metadata associated with the registration (e.g., time of day).

Over time, as the user engages in activities on the cloud-hosted service site, the value in her reputation field is adjusted based on the detection of unwanted behavior or its absence. The data in the other fields is updated as new information is developed, or if a change is detected (e.g., the user moves to a new location). Depending on these changes and the user's reputation value, the user may be moved to a different cluster, and the cluster mean risk score recomputed.

When a new user performs an action or posts a message on a cloud-hosted service site, analysis engine 120 analyzes it based on the "extrinsic" risk associated with the individual (i.e., his reputation value) and, in some implementations, "intrinsic" risk factors associated with the action itself. Some actions will be neutral, while others (e.g., posting a profanity-containing message) will have a higher assigned level of risk. Thus, if a new user was initially assigned a high level of suspicion based on her cluster assignment, and an action has an average or neutral level of suspicion, analysis engine 120 might block the action (through notification to the cloud-hosted service site or, in some embodiments, directly by sending executable commands to the cloud-hosted service site server 340 via the communications module); if the user was initially at low risk and the current action is of average or neutral risk, however, analysis engine 120 may permit the action. For example, consider an ambiguous comment left in connection with a hypothetical news article, assuming the system does not know whether the contents of the linked page are pertinent to the main article:

"Please visit my site: http://mysite.com"

This comment may link to supporting material, or may be a completely irrelevant (and undesirable, to the site owner) spam advertisement for an unrelated product. If the user has a reputation indicating low suspiciousness (or high trust), the anti-spam system may assume this comment is likely to be pertinent to the news article, and can make a decision whether to block or allow it without incurring the high computational cost of retrieving and categorizing the linked page. If, on the other hand, the user has a reputation indicating high suspiciousness (i.e. low trust), the anti-spam system may "play it safe" and block the comment until it is able to classify the page. If, at a later time, the destination of the link is determined to have been objectionable (profane, fraudulent, illegal, commercial, etc.), the reputation of the user (author) is adjusted appropriately.

Computationally, the user reputation may take the form of a score or coefficient reflective of suspiciousness. For example, a neutral user may have a coefficient of 1, and a suspicious user may have a score greater than one (how much greater depends on the chosen scaling); the coefficient can be multiplied by a baseline risk associated with an action, and if the product exceeds a threshold, it is blocked. Alternatively, the reputation value may be tiered rather than a continuous value. The user may, for example, be placed into a "trust tier," or the user may be given a virtual "balance" and various actions deduct various numbers of "credits." Any suitable way of expressing risk in a manner that can be objectively adjusted over time and applied to an action to create a risk score will be suitable.

4. Consolidation of User Profiles

The performance of user-based filters may be improved by connecting a single individual or "actor" with multiple user accounts and/or other online identities, thereby creating a "consolidated profile." In this way a confidence level can be established that a particular user account, IP address or other identifying attribute is associated with a particular actor. Different confidence levels may suffice depending on the remediary action to be taken; for example, holding a message for human review is obviously less draconian than rejecting the actor's registration at sign-up, and would therefore require a lower degree of confidence. Employing data from multiple cloud-hosted service sites not only corroborates data relationships and thereby increases associational confidence levels, but allows all such sites to receive the benefits of the consolidated profile for spam-detection and remediation purposes.

As described above, message analysis may utilize a "suspiciousness" score associated with an actor; this score may vary over time as additional actions are detected and evaluated. A third facility provided by some embodiments of the invention allows this actor to be identified and associated with his or her cloud-hosted service "identities" across sites. Data from multiple sites may therefore be used not only to identify the actor, but to refine and update the actor's "reputation."

When an actor signs up with multiple cloud-hosted service sites, various data items bearing on identity may be developed. For example, a new user may enter an email address, and the site may detect the user's IP address and an identifier (e.g., MAC address) associated with the computer. The user may also enter various interests. Each of these items may be a field in a database record assigned to the user, which is populated with as much user information as is available (e.g., obtained during sign-up and during subsequent user interactions with a cloud-hosted service site). The number of fields (i.e., data types) for each record will typically exceed what is likely to be available from any single source, but once a plurality of records is recognized as being associated with a single actor, the data items are aggregated into a consolidated profile richer than any single constituent record.

Figure 4:
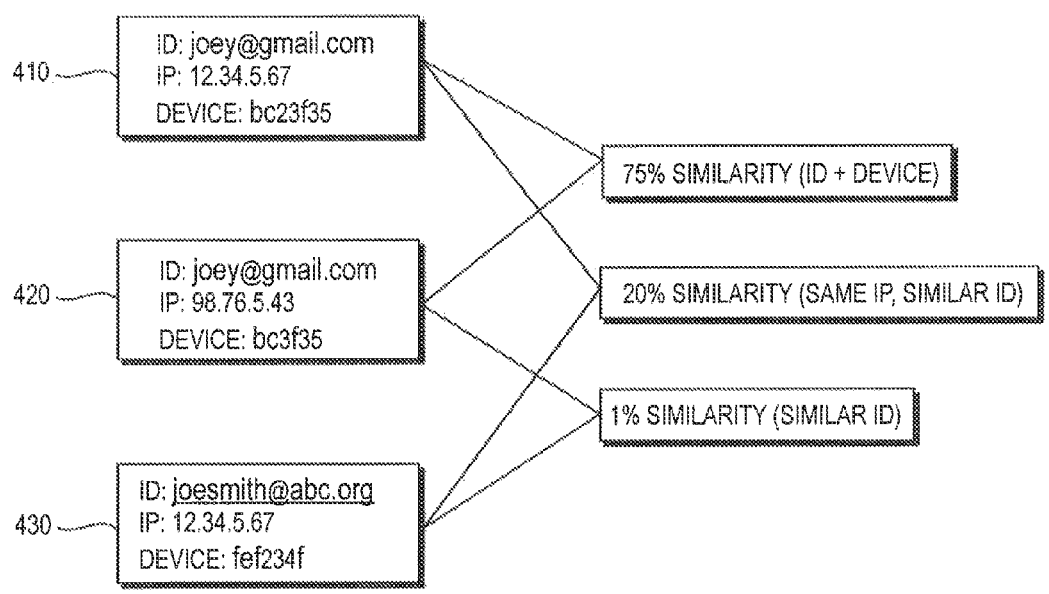
FIG. 4 graphically depicts how data among a plurality of cloud-hosted service users can be correlated.

Refer to FIG. 4, which shows three records each associated with a user, who may or may not be the same actor. Users 410 and 420 have the same email address. Identical email addresses are reliably (i.e., with a high confidence level) associated with a single actor, so users 410 and 420 are very likely the same actor. Users 410 and 430 share the same IP address. The association between an IP address and a particular actor is loose in itself, but can be corroborated. One corroborating factor (not shown in the figure) is temporal proximity. For example, the confidence level associated with a IP-address match might be, e.g., 75% within a single day, 50% if within 2-7 days, etc. The level may increase if the action (e.g., registration) that led to the capture of the IP address is identical across addresses. Another corroborating factor may arise from parsing email addresses for similarities, e.g., name cognates. Thus, because user 430 not only shares an IP address but also a name cognate (Joey vs. Joe) with user 410, the confidence level that they are the same person may be fairly high based solely on email and IP addresses, but one cannot be certain; Joey and Joe, for example, may be father and son.

Because multiple individuals (e.g., family members, co-workers, etc.) may use the same computer, the device ID is only somewhat reliable to uniquely identify an actor. But identical device identifiers may corroborate other indicia of identity, or at least narrow the space of possible relationships. In the case of users 410 and 420, for example, the data from these fields justify a fair degree of confidence that they correspond to the same actor.

It should be stressed that the fields mentioned above and in the diagram are merely a small subset of the total fields that may be used for the computation. For example, interests entered by a new user when registering on a cloud-hosted service site are obviously insufficient in themselves to associate different users, but can represent a weak corroborating factor. The fact that two users share the same IP address, and both demonstrate or self-declare an interest in a particular sporting team may combine to further boost the confidence that they are the same actor. Fields may include, for example, any one or more of the following representative items of information: an email address, an originating IP address, one or more identifiers associated with an originating computer, one or more identifiers associated with client software, a timestamp, a geographic location, at least one self-reported field, at least one behavioral attribute, or at least one specified interest.

The consolidated user profile may associate the separate database records with an actor, e.g., with two additional fields in each record: one that identifies the common user and another that specifies the degree of confidence of the association. Each record may be independently associated with multiple other records. In some embodiments, a "root" or base record is designated, and other related records are associated with the root to a specified confidence level; in FIG. 4, for example, if user 410's record is the root, the records for users 420 and 430 are associated with user 410 rather than with each other (i.e., there is no relationship specified between user 420 and user 430, even though that association may be the transitive basis for associating user 430 with user 410). The root record may be the one for which the most information, or positively identifying user information (e.g., name and address), is available. In FIG. 4, with the user 410 record designated the root, user 420 may be associated with high (e.g., 75%) confidence, and user 430 may be associated with a lesser (e.g., 20%) degree of confidence. In some implementations, the consolidated profile may be a single collection of field values from records associated with a sufficiently high (e.g., >65%) degree of confidence; again, that threshold may vary depending on the actions to be taken based on the association. A suspiciousness level from any of the associated records may be copied to the other records; for example, the highest level of suspiciousness (based on an objection user action) may be used across records so long as the association confidence level is high enough. Alternatively, "clusters" may be created through the use of unsupervised machine learning or a similar technique; using this approach, no "root" is identified, but rather a collection of accounts with sufficient similarity are grouped together and attributes and reputational information shared amongst them.

It should be emphasized that the present invention may be used to score user commonalities other than suspiciousness. For example, actions may be taken with respect to a new user based on, for example, a common interest with members of a cluster or a cluster-based score indicating a user's receptiveness to advertisement.

The system architecture shown in FIG. 3 may be used to implement a profile-consolidation facility in accordance herewith. User characteristics relevant to profile database fields obtained on customer cloud-hosted service sites 340 (during user sign-up and subsequently, based on user actions) may be sent to antispam server 100 by means of an automated process running on each of the cloud servers 340; for example, this process may access the antispam server 100 via the Internet using an API. In other embodiments, the antispam server 100 itself hosts one or more of the cloud-hosted service websites 340, or may employ a "pull" approach that retrieves data from the websites 340 on a periodic basis.

Analysis engine 120 analyzes user database records and field values from cloud-hosted service sites 340 as these accumulate in master database 110. Analysis engine 120 associates the records as described above, and may repeat the analysis (and update the association confidence levels) periodically and/or as new data is obtained. Analysis engine 120 may then propagate these associations to the various cloud-hosted service sites. For example, analysis engine 120 may send a suspiciousness level associated with a site user based on the consolidated profile. Analysis engine 120 may also take direct action with respect to messages posted or other actions taken by a cloud-hosted service user based on the consolidated profile; for example, analysis engine 120 may itself delete (or alert a cloud-hosted service site to delete) a post from a suspicious user on any member cloud-hosted service site 340.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A method of moderating activities on cloud-hosted service sites, the method comprising the steps of:
    creating a database record for a first user when the first user registers at a first cloud-hosted service site, the database record including a plurality of profile fields and data in at least some of the profile fields;
    based on data in the profile fields of the first user's database record, assigning an initial risk score to the first user;
    identifying a cluster of database records associated with other users based on similarities in the profile fields thereof with respect to the profile fields of the first user, the record cluster having an associated composite risk score based on risk scores associated with the other users;
    assigning the composite risk score to the first user; and
    based on the first user's resultant risk score, taking an action with respect to a transaction conducted by the first user on the first cloud-hosted service site.

2. The method of claim 1, further comprising modifying the first user's risk score based on actions taken by the first user over time.

3. The method of claim 1, wherein the action is taken is also based on a message-level risk score.

4. The method of claim 3, wherein the message-level risk score is dictated by characteristics of the message.

5. The method of claim 3, wherein the message-level risk score is dictated by proximity in time and IP address to prior actions that have been identified as objectionable.

6. The method of claim 1, wherein the profile fields on which the initial risk score is assigned comprise username, geographical location of the first user, and prior actions associated with the first user's computer.

7. The method of claim 6, wherein the initial risk score is based at least in part on a probability that the username was computationally generated.

8. The method of claim 1, wherein the action is alerting the first cloud-hosted service site to prevent the transaction from completing.

9. The method of claim 1, wherein the action is preventing the first cloud-hosted service site from posting of the message.

10. The method of claim 1, wherein the cloud-hosted service site is a social media site.

11. The method of claim 1, wherein the action is applied to each of the other users in the identified cluster.

12. A server for moderating activities on cloud-hosted service sites, the server comprising:

a master database comprising electronically stored records for users registered at a plurality of cloud-hosted service sites, each database record including a plurality of electronically stored profile fields and data electronically stored in at least some of the profile fields;

a communications module for communicating bidirectionally with cloud-hosted service sites, the communications module being configured to receive, from the cloud-hosted service sites, messages posted by users thereon and data associated with newly registering users; and an analysis engine for managing the master database and assessing messages posted by users on cloud-hosted service sites and received via the communications module, the analysis engine being configured to:

create a database record for a first user when the first user registers at a first cloud-hosted service site, the database record including a plurality of profile fields and data, received via the communications module from the first cloud-hosted service site pursuant to the first user's registration thereon, in at least some of the profile fields;

compute an initial risk score for the first user based on data in the profile fields of the first user's database record and assign the initial risk score to the first user;

identify a cluster of records in the master database associated with other users based on similarities in the profile fields of the corresponding database records, the cluster having an associated composite risk score based on risk scores associated with the other users;

assign the composite risk score to the first user; and based on the first user's composite risk score, take an action with respect to a message posted by the first user on the first cloud-hosted service site.

13. The server of claim 12, wherein the analysis module is further configured to (i) receive data from the first cloud-hosted service site corresponding to actions taken by the first user over time and (ii) modify the first user's risk score based on the received data.

14. The server of claim 12, wherein the analysis module is configured to take the action based also on a message-level risk score.

15. The server of claim 14, wherein the message-level risk score is dictated by characteristics of the message.

16. The server of claim 14, wherein the message-level risk score is dictated by proximity in time and IP address to prior actions that have been identified as objectionable.

17. The server of claim 16, wherein the initial risk score is based at least in part on a probability that the username was computationally generated.

18. The server of claim 12, wherein the profile fields on which the initial risk score is assigned comprise username, geographical location of the first user, and prior actions associated with the first user's computer.

19. The server of claim 12, wherein the action is sending an alert, via the communications module, to the first cloud-hosted service site to suppress posting of the message.

20. The server of claim 12, wherein the action is preventing, via the communications module, the first cloud-hosted service site from posting the message.

* * * * *